US006988944B1

(12) United States Patent
Syers

(10) Patent No.: US 6,988,944 B1
(45) Date of Patent: Jan. 24, 2006

(54) GAME SKINNING TOOL

(76) Inventor: Jack Allen Syers, 1410 Houston Dr. West, La Marque, TX (US) 77568

( * ) Notice: Subject to any disclaimer, the term of this patent is extended or adjusted under 35 U.S.C. 154(b) by 0 days.

(21) Appl. No.: 10/968,854

(22) Filed: Oct. 19, 2004

(51) Int. Cl.
A22B 5/16 (2006.01)
(52) U.S. Cl. .................................... 452/125
(58) Field of Classification Search ......... 452/187–191
See application file for complete search history.

(56) References Cited

U.S. PATENT DOCUMENTS

| | | | |
|---|---|---|---|
| 3,871,084 A * | 3/1975 | Carrington et al. ......... | 452/128 |
| 5,236,386 A | 8/1993 | Dingee | |
| D345,780 S | 4/1994 | Ream | |
| 5,336,124 A * | 8/1994 | Garside ...................... | 452/125 |
| 5,336,129 A * | 8/1994 | Frith .......................... | 452/187 |
| 5,482,501 A * | 1/1996 | Frits .......................... | 452/125 |
| 5,562,534 A | 10/1996 | McGough | |
| 6,132,305 A | 10/2000 | Witherell | |
| D462,416 S | 9/2002 | Dallas, Sr. | |
| 6,569,005 B2 | 5/2003 | Maxwell | |

* cited by examiner

Primary Examiner—Thomas Price
(74) Attorney, Agent, or Firm—Streets & Steele; Frank J. Campigotto; Patrick K. Steele

(57) ABSTRACT

The present invention provides a tool for gripping the skin of a game comprising a mass tethered to a collar formed of a rigid material. The mass is tethered to the collar with a flexible cord. The skinning tool enables the user to grip and to forcibly pull the skin of a game by placing a sheet of the skin around the mass and engaging the mass through the skin with a collar of rigid material to form a generally arcuate line or contract between the collar and the skin, and the skin and the mass. The rigid material from which the collar is formed may be coupled to a pulling tool such as a hook and winch, or to a cross-bar for pulling by hand.

13 Claims, 4 Drawing Sheets

GAME SKINNING TOOL

BACKGROUND OF THE INVENTION

1. Field of the Invention

The present invention is in the field of fabric handling. The present invention is in the field of tools for skinning game.

2. Description of the Related Art

Hunters have killed and skinned wild game since before recorded time. Skinning of game requires the gripping and forcible pulling of the skin of the game. Animal fat and body fluids can make it difficult to grip and pull the skin from the body of a game.

In the skinning process, cuts are typically made around the neck and on the limbs and extremities of the game in order to expose a suitable flap of skin for gripping and pulling. After the game is suspended by the neck or hind legs, a flap of skin is exposed and is generally gripped and forcibly pulled downwardly along the length of the body of the game. Gripping the flap of skin with bare or gloved hands is often difficult, especially in cold weather when the skin adheres more securely to the game. Tools commonly used by hunters for gripping the skin of a game include pliers, locking pliers, clamps, etc.

Another method of gripping the skin of a game is to use a mass, such as a rock, wrapped in the flap of skin of the game and then captured by a noose formed in a rope. This technique for gripping a flap of skin is demonstrated in FIG. 6 of U.S. Pat. No. 5,562,534.

However, these skin gripping tools and techniques are often ineffective, difficult to use or difficult to implement in the field. Pliers and clamps securely grip a very small area of skin, and may tear the skin upon forcible pulling. Such tools may become lost in forest undergrowth or may be difficult to locate in the dark. The "rock and rope" technique shown in U.S. Pat. No. 5,562,534 grips a larger area of skin, but a rock of the needed size and shape may be difficult to locate in the field. Even where rocks may be plentiful, a rock cannot be coupled to a length of rope, and the rock or the rope are easily lost in the field. Rocks may be unavailable or difficult to find in the area where the game is obtained, especially in swampy regions. Also, rocks are often smooth and unsuitable for gripping the skin of the game.

What is needed is a tool for securely gripping and pulling a sheet of fabric, such as skin. What is needed is a tool for securely gripping and pulling the skin of a game. What is needed is a tool for gripping skin that is easily coupled to a winch, a cross-bar or some other tool that enables a user to comfortably grip the skinning tool or to forcibly pull the skin using mechanical advantage. What is needed is a tool for gripping the skin of a game that is easily and quickly engaged and disengaged from the skin, and one that is self-contained and designed to prevent misplacement of its components.

SUMMARY OF THE INVENTION

The present invention provides a skinning tool for gripping the skin of a game comprising a mass that is flexibly tethered to a collar. The collar is shaped to define an arcuate portion adjacent to an interior space defined by legs extending from the arcuate portion. The minimum width of the interior space near the arcuate portion is approximately equal to or is less than the diameter or girth across the mass. Either the mass or the collar, or both, may have rough or treaded gripping surfaces, or the gripping surfaces may be improved using a rubberized coating.

The skinning tool of the present invention is used by cutting the game in a manner that exposes a flap of skin of sufficient size to substantially enclose or envelop the mass by gathering the excess skin to one side of the mass, and then by forcing the collar around the skin of the game where it is gathered to substantially enclose or envelop the mass. The collar is designed to capture the gathered skin within the interior space between the legs and to abut the mass with the arcuate portion of the collar through the skin of the game. The skin is gripped between the collar and the mass along a generally arcuate line of contact.

BRIEF DESCRIPTION OF THE DRAWINGS

So that the above recited features and advantages of the present invention can be understood in detail, a more particular description of the invention, briefly summarized above, may be had by reference to the embodiments thereof that are illustrated in the appended drawings. It is to be noted, however, that the appended drawings illustrate only typical embodiments of this invention and are, therefore, not to be considered limiting of its scope, for the invention may admit to other equally effective embodiments.

DETAILED DESCRIPTION OF THE INVENTION

Figure 1:
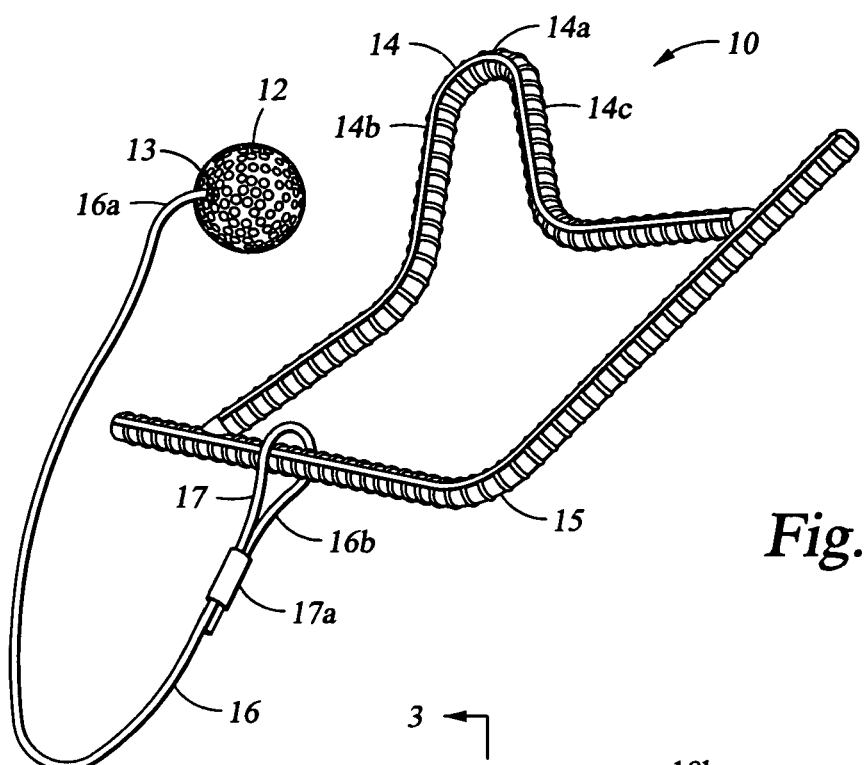
FIG. 1 is a perspective view of one embodiment of the skinning tool of the present invention.

The present invention comprises a skinning tool having a mass that is flexibly tethered to a collar. FIG. 1 is a perspective view of one embodiment of the skinning tool 10 of the present invention. The collar 14 of the skinning tool 10 has a first leg 14b and a second leg 14c diverging from an apex 14a. The legs 14b, 14c are coupled to a "V"-shaped bar 15. The tether 16 coupling the mass 12 to the collar 14 may compromise a wire rope, nylon cord, chain or other suitable material that is flexible and which can be easily coupled to the mass 12 and to the collar 14. The mass 12, the collar 14 and the tether 16 may be made of generally corrosion-resistant materials or these components may have protective coatings. The tether 16 has a first end 16a and a second end 16b. The tether 16 is coupled at its first end 16a to the mass 12 using a fastener 13, such as a screw. The tether 16 may be coupled at its second end 16b to the collar 14 using a fastener. If the collar 14 and the "V"-shaped bar 15 (or some other pulling tool) form a closed structure, such as the collar 14 and "V"-shaped bar 15 shown in FIG. 1, the tether 16 can be coupled at its second end 16b to the collar 14 using a loop 17 held closed with a clamp 17a.

The skinning tool 10 is for gripping a sheet of fabric or skin. The shape of the collar 14 of the skinning tool 10 should maximize the grip area of the skinning tool 10, and thereby minimize localized tearing stresses in order to prevent tears in the skin during skinning. In the embodiment of the present invention shown in FIG. 2, the mass 12 is generally spherical in shape and the collar 14 has a generally arcuate portion 14a located at the apex of the collar 14. When the collar 14 captures the skin 18 where it is gathered to substantially envelop the mass 12, the arcuate portion 14a of the collar 14 abuts and secures the mass 12 within the skin 18. The legs 14b, 14c of the collar 14 may be substantially parallel, but may also be slightly divergent as they extend downwardly away from the arcuate portion 14a of the collar 14. The angle formed by the legs 14b, 14c of the collar 14, if any, is preferably less than 30 degrees, more preferably less than 15 degrees. It should be noted that the legs 14b, 14c may actually form a converging (or negative) angle as they extend outwardly from the generally arcuate portion 14a of the collar 14. The important function served by the shape of the collar 14 is to capture the mass 12 within the sheet of skin 18. The legs 14b, 14c may also be non-linear. The shape of the interior space defined by the legs 14b, 14c is for the purpose of receiving and capturing the gathered portion of the skin flap at the end of the interior space opposite the arcuate portion 14a. The open end between the legs 14b, 14c of the collar 14 allows quick gripping of the skin 18 and quick release of the skin 18 through the open end of the collar 14.

Gross irregularities in the surface of the mass 12 or the collar 14 may result in increased localized tearing stress in the skin 18 at the irregularities and a corresponding increased likelihood of tearing the skin 18 during skinning. For this reason, a generally spherical mass 12 of a diameter approximately equal to or larger than the radius of the arcuate portion 14a of the collar 14 is preferred. Regularly spaced and uniform protrusions or dimples on the exterior surface of the mass 12, the arcuate portion 14a and the gripping surfaces of the legs 14b, 14c of the collar 14 improve gripping of the skin 18 during skinning. For example, rebar commonly used in commercial and road construction is a suitable material for forming the collar 14. Alternately, a rubberized or non-slip coating on one or more of these components may be used.

Figure 2:
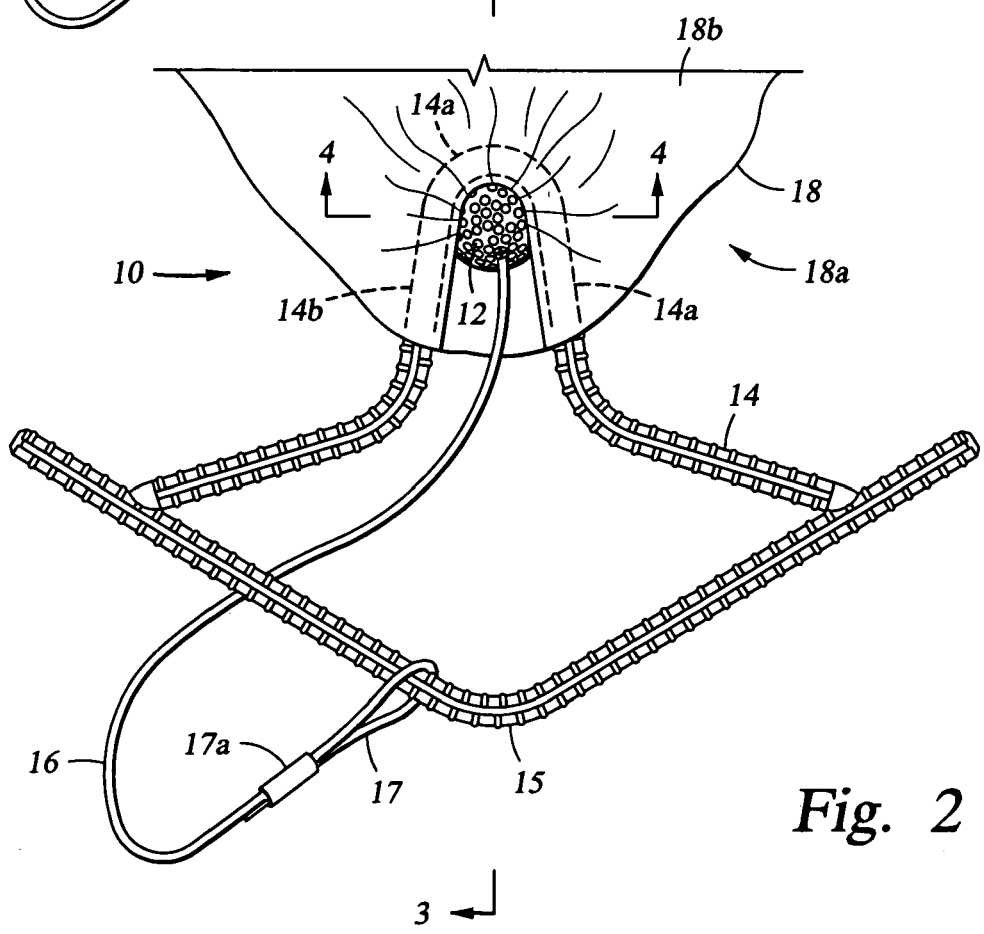
FIG. 2 is an elevational view of the skinning tool of the present invention with the mass substantially enveloped within a flap of the skin of a game and the skin is gathered at one side of the mass and captured within the interior space of the collar.
Figures 3, 4:
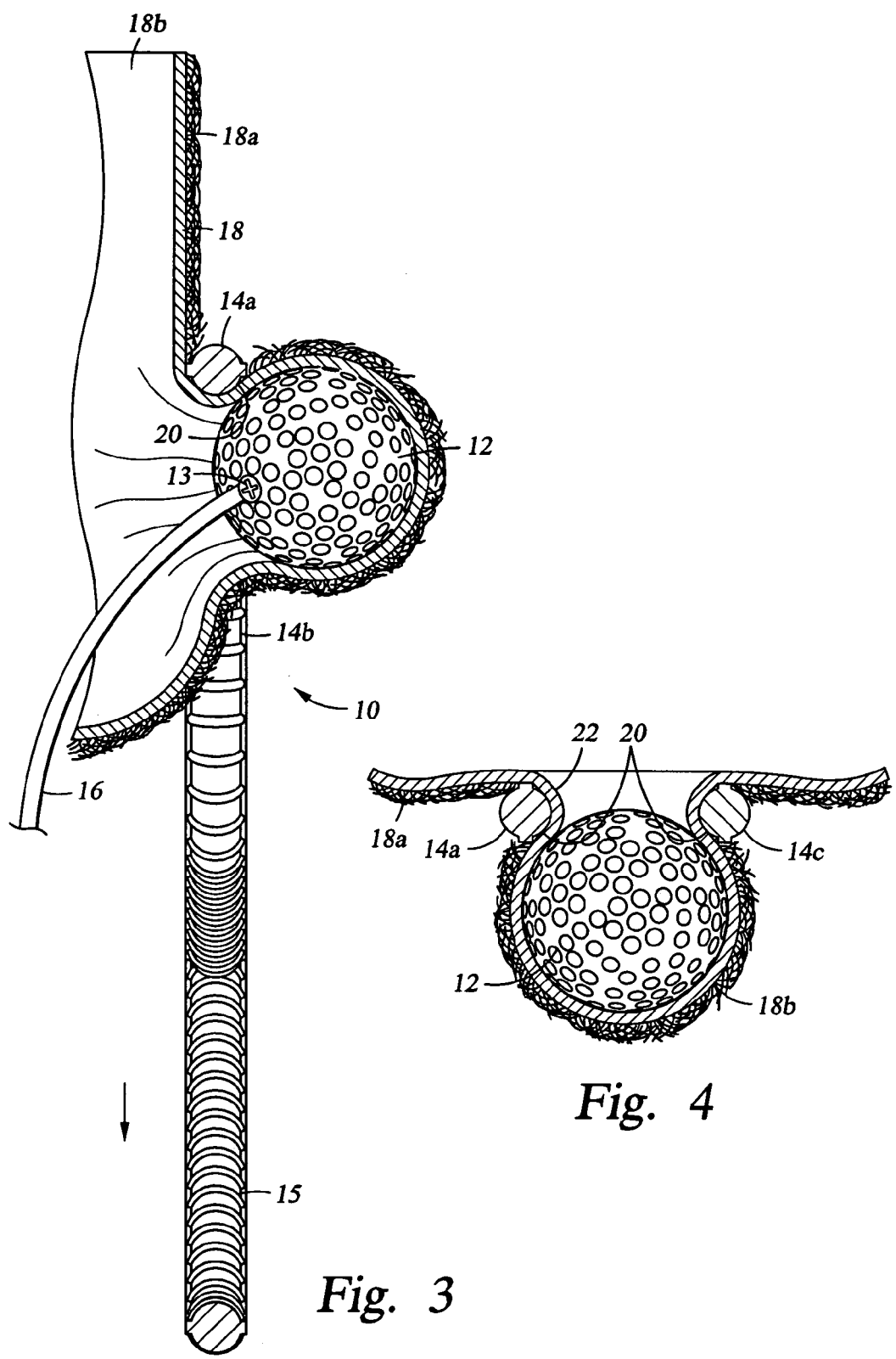
FIG. 3 is a vertical cross-sectional view of the skinning tool of the present invention showing the skinning tool in its gripping configuration with the collar capturing the gathered portion of the skin of the game within the interior space of the collar.
FIG. 4 is a horizontal cross-sectional view of the skinning tool of the present invention showing the tool in its gripping configuration with the mass substantially enclosed by a sheet of the skin of a game and the collar engaging the mass through the skin of the game along a generally arcuate line of contact.
Figure 5:
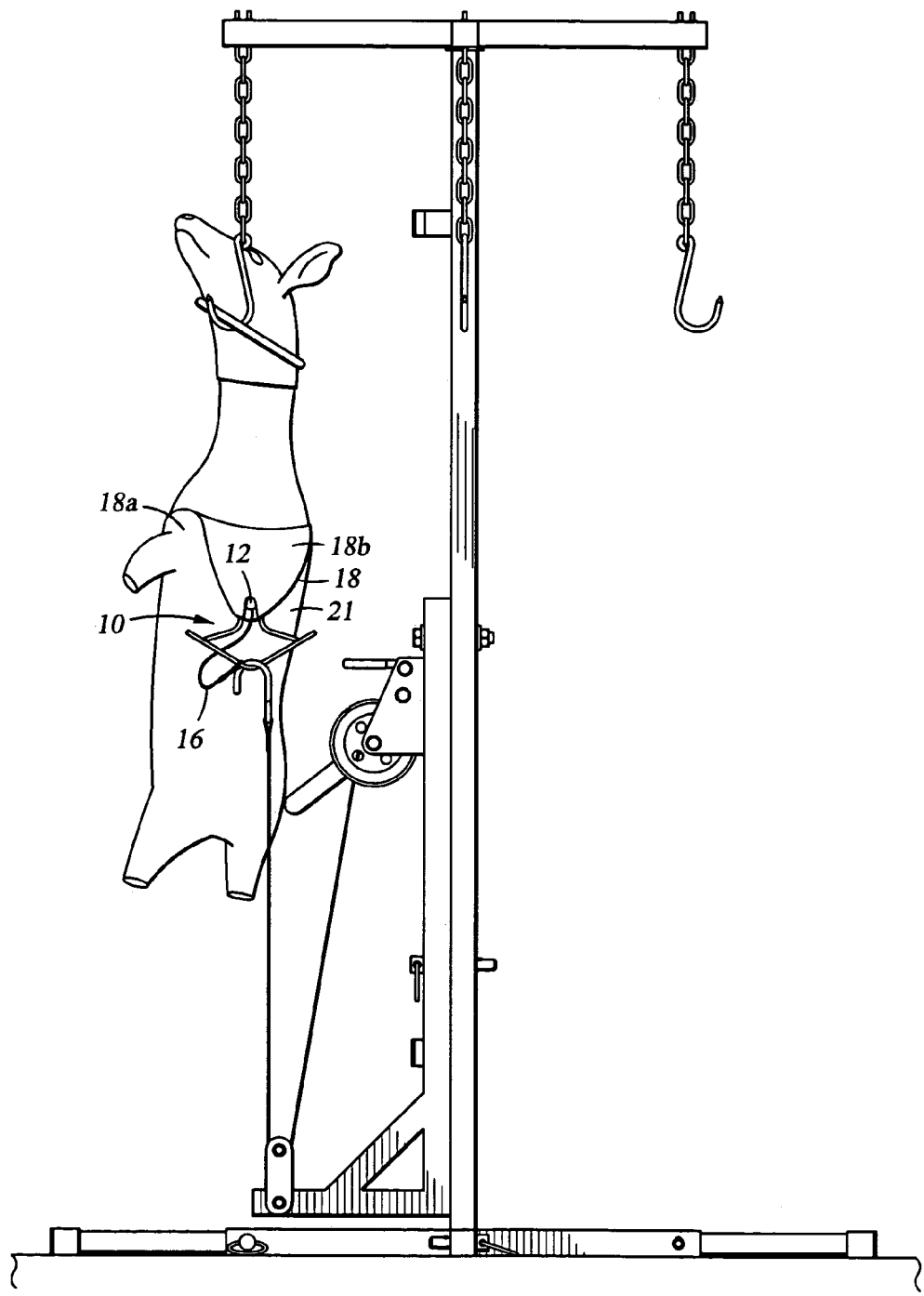
FIG. 5 is an elevational view of a game gallows having a winch coupled to the skinning tool of the present invention that is engaged with and gripping a flap of skin of a game.
Figure 6:
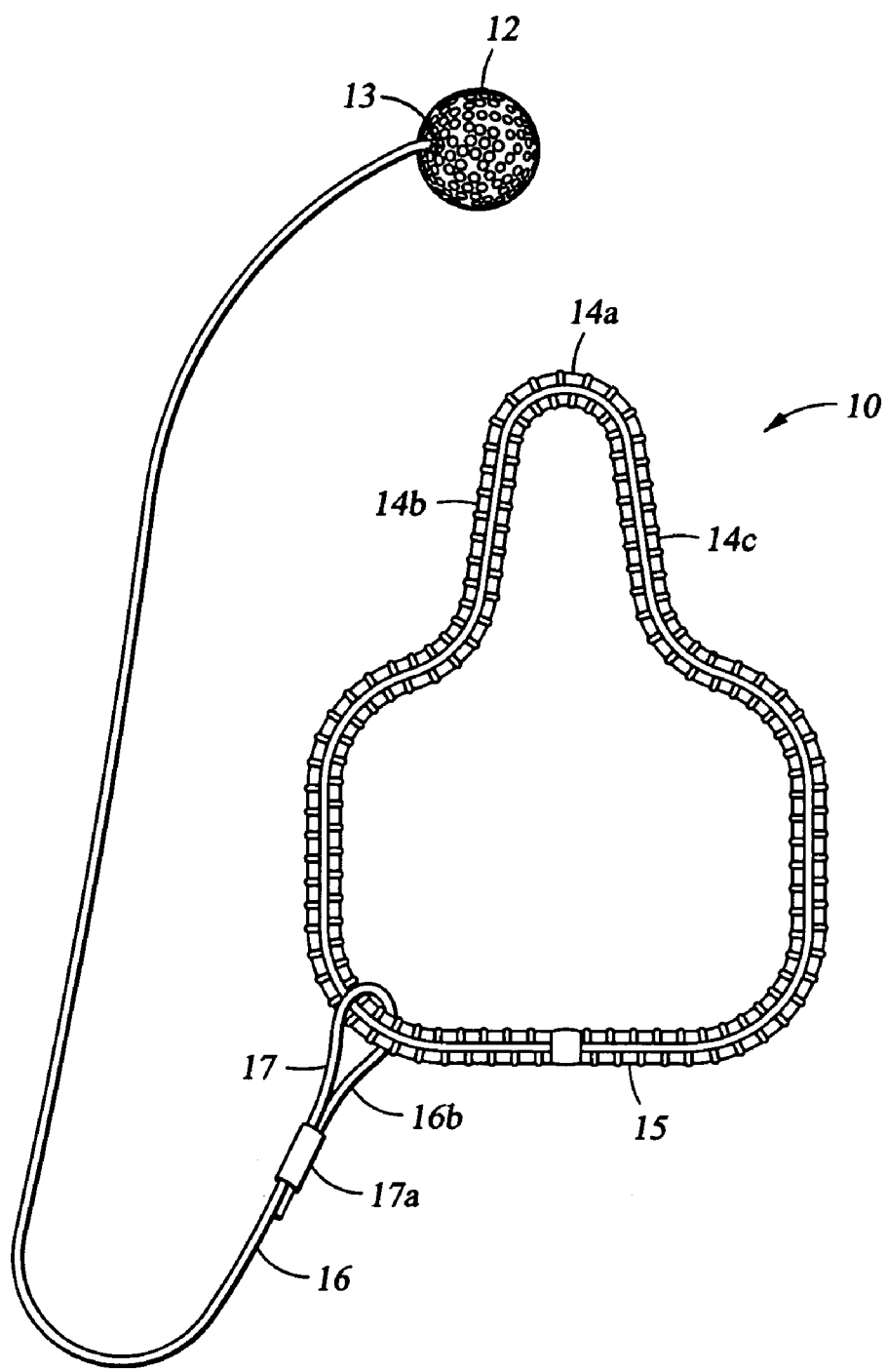
FIG. 6 is an elevational view of an alternative embodiment of the present invention adapted to accommodate pulling by a human hand.

The collar 14 of the present invention may be coupled to a pulling tool, such as a handle winch hook or a cross-bar. A rigid material, such as rebar, can be easily formed into an integrated collar/winch hook, as shown in FIGS. 1 and 2, or it can be easily formed into an integrated collar/"T"-bar. Alternately, the present invention may be adapted for coupling to a handle as shown in FIG. 6. It should be noted that the "V"-bar 15 shown in FIGS. 1–5 is not an element of the present invention, and merely provides a convenient accessory to the skinning tool of the present invention. Another useful embodiment of the present invention is shown in FIG. 6 which shows the present invention coupled to a handle designed to accommodate a human hand.

It will be understood from the foregoing description that various modifications and changes may be made in the preferred and alternative embodiments of the present invention without departing from its true spirit.

This description is intended for purposes of illustration only and should not be construed in a limiting sense. The scope of this invention should be determined only by the language of the claims that follow. The term "comprising" within the claims is intended to mean "including at least" such that the recited listing of elements in a claim are an open group. "A," "an" and other singular terms are intended to include the plural forms thereof unless specifically excluded.

It will be understood from the foregoing description that various modifications and changes may be made in the preferred and alternative embodiments of the present invention without departing from its true spirit. For example, the collar of the skinning tool integrally combined with a pulling tool or other structure may form a closed loop, and the collar may have generally parallel legs forming an interior space or the legs may form a generally symmetrical space.

What is claimed is:

1. A skinning tool for gripping a flap of the skin of a game comprising:
   a mass having a girth;
   a collar formed of a rigid material and having an arcuate portion and a pair of legs extending therefrom defining an interior space between the legs; and
   a tether flexibly coupling the mass to the collar; wherein the distance across at least a portion of the interior space is less than the girth of the mass.

2. A skinning tool for gripping a flap of the skin of a game comprising:
   a generally spherical mass;
   a collar having an arcuate portion and two legs extending therefrom defining an inner space, said collar being formed of a rigid material; and
   a tether for securing the collar to the mass; wherein the minimum distance from one leg to the other across the interior space is less than the diameter of the mass.

3. The skinning tool of claim 1, wherein the mass is generally spherical in shape and wherein the girth is the diameter of the mass.

4. A skinning tool comprising:
   a generally spherical mass tethered to a rigid collar having an arcuate portion, a pair of legs extending therefrom, and an opening defined by the legs and located opposite the arcuate portion;
   wherein the collar is adapted for capturing the mass within a sheet of skin of a game.

5. The skinning tool of claim 4 wherein the arcuate portion of the collar has an abutting surface that is adapted for abutting the curved surface of the generally spherical mass along a generally contiguous path.

6. The skinning tool of claim 4 wherein the abutting surface comprises a plurality of protrusions.

7. The skinning tool of claim 4 wherein the abutting surface comprises a plurality of dimples.

8. The skinning tool of claim 4 wherein the exterior surface of the mass comprises a plurality of protrusions.

9. The skinning tool of claim 4 wherein the exterior surface of the mass comprises a plurality of dimples.

10. The skinning tool of claim 4 wherein the collar is adapted for coupling to a handle.

11. The skinning tool of claim 4 wherein the collar is adapted for coupling to a winch for pulling the skin of a game.

12. The skinning tool of claim 4 wherein the legs generally diverge as they extend from the arcuate portion of the collar.

13. A method of skinning a game comprising:
  (a) exposing a flap of skin of the game sufficiently large to envelop a mass;
  (b) enveloping the mass within the flap of skin by gathering excess skin at one side of the mass;
  (c) capturing the mass within the flap of skin by forcing an open-ended rigid collar around the gathered skin; and
  (d) forcibly moving the collar in the direction of the open-end of the collar to pull the skin.

* * * * *